United States Patent
Roming et al.

(10) Patent No.: US 8,800,928 B2
(45) Date of Patent: Aug. 12, 2014

(54) SHELL SEGMENT FOR PRODUCING A FUSELAGE CELL SECTION FOR A FUSELAGE CELL OF AN AIRPLANE

(75) Inventors: Thorsten Roming, Himmelpforten (DE); Hansjörg Horneber, Hamburg (DE); Thorsten Schröer, Buxtehude (DE); Tobias Wirtz, Munich (DE); Klaus Edelmann, Bremen (DE); Tanja Menken (Frese), Horstedt (DE)

(73) Assignee: Airbus Operations GmbH, Hamburg (DE)

( * ) Notice: Subject to any disclaimer, the term of this patent is extended or adjusted under 35 U.S.C. 154(b) by 235 days.

(21) Appl. No.: 13/384,033

(22) PCT Filed: Jul. 15, 2010

(86) PCT No.: PCT/EP2010/060194
§ 371 (c)(1), (2), (4) Date: Feb. 16, 2012

(87) PCT Pub. No.: WO2011/006954
PCT Pub. Date: Jan. 20, 2011

(65) Prior Publication Data
US 2012/0132756 A1    May 31, 2012

Related U.S. Application Data

(60) Provisional application No. 61/225,933, filed on Jul. 16, 2009.

(30) Foreign Application Priority Data

Jul. 16, 2009   (DE) .......................... 10 2009 033 444

(51) Int. Cl.
*B64C 1/12* (2006.01)

(52) U.S. Cl.
USPC ......................................................... 244/131

(58) Field of Classification Search
USPC .................... 244/119, 120, 123.1, 129.1, 131
See application file for complete search history.

(56) References Cited

U.S. PATENT DOCUMENTS

2009/0283638 A1* 11/2009 Arevalo Rodriguez et al. ............................. 244/119

FOREIGN PATENT DOCUMENTS

WO      2009/037006 A1     3/2009

* cited by examiner

*Primary Examiner* — Timothy D Collins
*Assistant Examiner* — Nicholas McFall
(74) *Attorney, Agent, or Firm* — Carter, DeLuca, Farrell & Schmidt, LLP

(57) ABSTRACT

The invention concerns a shell segment for the purpose of manufacturing a fuselage cell section for a fuselage cell of an aeroplane, with at least one skin field and with a multiplicity of longitudinal stiffeners arranged thereon, in particular stringers, and also at least one transverse stiffening element running transverse to the longitudinal stiffeners, in particular at least one frame.

In that the connection of the at least one transverse stiffening element to the at least one skin field is undertaken with at least one connecting bracket wherein the at least one connecting bracket has at least one corrugation, the supporting brackets for purposes of absorbing tilting moments of the frames, in forms of embodiment of shell segments of prior known art, can be omitted. By this means a considerable weight reduction is possible with, at the same time, a reduced production effort.

11 Claims, 2 Drawing Sheets

SHELL SEGMENT FOR PRODUCING A FUSELAGE CELL SECTION FOR A FUSELAGE CELL OF AN AIRPLANE

TECHNICAL FIELD

The invention concerns a shell segment for the purpose of manufacturing a fuselage cell section for a fuselage cell of an aeroplane, with at least one skin field and with a multiplicity of longitudinal stiffeners arranged thereon, in particular stringers, and also at least one transverse stiffening element, in particular at least one frame, running essentially transverse to the longitudinal stiffeners.

BACKGROUND

In modern aeroplane construction fuselage cells in the aluminium form of construction, which continues to find widespread application, are formed by the placing of a multiplicity of approximately barrel shaped fuselage sections in series one behind another. The fuselage sections are themselves often constructed with at least two shell segments, which are integrated along longitudinal seams to form a fuselage section. The shell segments are themselves provided with a multiplicity of longitudinal stiffeners, in particular stringers, running parallel to the longitudinal axis of the aeroplane fuselage cell on the related skin field, for purposes of stiffening. Annular frames, or annular frame segments, run transverse to these longitudinal stiffeners. The mechanical connection of the annular frames to the skin fields and to the longitudinal stiffeners is undertaken using connecting brackets, and also a large number of supporting brackets. The supporting brackets, which are preferably provided at crossing points between the longitudinal stiffeners and the annular frames, in particular prevent the tilting or buckling of the annular frames under high loads.

From DE 10 2007 044 386 A1, for example, a structural component and a method for the stiffening of an outer skin of an aircraft or a spacecraft are of known art. Here the connection of the annular frames to the skin field is undertaken by means of an angular-shaped foot element, which is provided in the crossing regions between a frame profile and a stringer profile, with an approximately U-shaped cut-out to allow a stringer profile to pass through. The cut-out of the foot element is supported on a spacer of a plastic material, which in turn at least in some regions is positioned in the crossing region between the annular frame and the stringer profile in a form fit on the head region of the stringer. What is disadvantageous, however, is the fact that the disclosed design effects just the support of a stringer, so that now as before separate frame supports (so-called "cleats") must be provided for the purpose of supporting the frame.

The object of the invention is to create a shell segment of a constructively simpler design compared with the known prior art, for the purpose of the manufacture of fuselage sections for the production of aeroplane fuselage cells, and at the same time to ensure a sufficient security against tilting or buckling of the annular frames.

SUMMARY

This object is achieved by means of a shell segment with the features of claim 1.

In that the connection of the at least one transverse stiffening element to the at least one skin field is undertaken with at least one connecting bracket, wherein the connecting bracket has at least one corrugation, a constructively simpler design of shell segment ensues compared with previous solutions of known art, since in the crossing regions only one inventively designed connecting bracket is required between a longitudinal stiffener and a transverse stiffening element in each case. In addition to its primary function in the form of the mechanical connection of the frame to the skin field, the connecting bracket ensures that any tilting or buckling of the annular frame under load is securely prevented. The inventively configured connecting bracket can find application both in shell segments that have been manufactured in the traditional aluminium form of construction, and also in the case of shell segments that at least in some regions have been manufactured with fibre-reinforced composite materials.

In an advantageous development of the shell segment provision is made that the at least one connecting bracket has a frame attachment surface and a skin attachment surface, which adjoin one another at an angle of between 45° and 135°.

By this means, in particular in terms of static loads, an optimal connection of the transverse stiffening element to the related skin field is provided. The value of the angle preferably lies in a range between 70° and 110° (≈90°±20°). A value outside this range is in particular required if the connecting brackets are installed in a strongly spherically curved region, that is to say, in a region curved in at least one dimension, of the fuselage cell structure, i.e. of the fuselage cell skin.

In a further advantageous configuration provision is made that the at least one corrugation is formed in the region of the frame attachment surface, and in the region of the skin attachment surface.

By this means a high stiffness ensues between the attachment surfaces of the connecting bracket, so that any tilting or buckling of the annular frame that is hereby attached to the related skin field is securely prevented.

In accordance with a further development of the shell segment provision is made that the at least one corrugation has two flanking surfaces, which adjoin one another in the region of a apex line at an angle of between approx. 30° and 120°.

As a consequence of this geometrical configuration the connecting bracket has a very high load-bearing capability. Furthermore this geometry allows the manufacture of the connecting bracket with an acceptable level of production engineering effort using both metallic materials and also fibre-reinforced composite materials.

Furthermore provision is made that the apex line of the corrugation subtends an angle of between 95° and 145° with the skin attachment surface.

As a consequence of this range of angles a maximum supporting action is achieved between the frame attachment surface and the skin attachment surface of the connecting bracket as a result of the formed corrugation.

A further advantageous configuration of the shell segment envisages that the longitudinal stiffeners are designed integrally with the at least one skin field, and have a cross-sectional geometry of an approximately trapezoidal shape.

By this means both the skin field and also the longitudinal stiffeners can be produced with an acceptable level of production engineering effort using fibre-reinforced composite materials, in particular using carbon fibre-reinforced epoxy resins. For cases in which conventional aluminium alloys and/or titanium alloys find application in the manufacture of the skin fields and/or the longitudinal stiffeners, the longitudinal stiffeners can have almost any suitable cross-sectional geometry. For example, stringer profiles of known art, with an L-shaped, Z-shaped, T-shaped, or Ω-shaped cross-sectional geometry, can be deployed as the longitudinal stiffeners.

In accordance with a further configuration of the shell segment the at least one skin field and the longitudinal stiffeners are formed using a carbon fibre-reinforced plastic material, in particular using a carbon fibre-reinforced epoxy resin.

As a consequence of this configuration weight advantages can ensue in comparison with a traditional metallic form of construction. Moreover in individual cases higher strengths can be achieved. Furthermore the susceptibility of the shell segment to corrosion is reduced, as a result of which the level of inspection and maintenance effort associated with an aeroplane fuselage cell hereby produced is significantly reduced over the whole service life. The transverse stiffening elements necessary for the further stiffening of the shell segment can likewise be formed using such fibre-reinforced composite materials and/or using metallic materials, in particular using aluminium alloy materials and/or titanium alloys.

In accordance with a further development the at least one connecting bracket is formed using a carbon fibre-reinforced plastic material, in particular using a carbon fibre-reinforced epoxy resin material and/or a carbon fibre-reinforced thermoplastic plastic material.

From this a significant potential weight saving in general ensues and moreover the corrosion characteristics improve, in particular if both the at least one skin field and also the longitudinal stiffeners of the shell segment arranged thereon have been manufactured using fibre-reinforced composite materials of this kind.

In a further development of the shell segment provision is made that the at least one connecting bracket is connected with the at least one transverse stiffening element and the at least one skin field by means of connecting elements, in particular using rivets and/or bolts, and/or by means of an adhesive joint.

As a consequence of this mechanical composite between the connecting bracket, the skin field with the longitudinal stiffeners arranged thereon, and the related transverse stiffening elements an extraordinarily high mechanical load capability ensues for the shell segment in all spatial directions relevant to the loads.

For cases in which the skin field of the shell segment with the longitudinal stiffeners arranged thereon, the connecting brackets and the transverse stiffening elements are formed, for example, using a carbon fibre-reinforced epoxy resin, or a carbon fibre-reinforced thermoplastic plastic material, the connecting elements deployed should in general be formed using titanium alloys, in order to inhibit unwanted corrosion effects.

A further development of the shells segment envisages that a connecting bracket is provided in each case between each pair of longitudinal stiffeners and a related transverse stiffening element.

By this means a uniform connection of the transverse stiffening element to the skin field of the shell segment is provided, thereby aligned with the distribution of forces.

DETAILED DESCRIPTION

In the figures the same design elements have the same reference numbers in each case.

Figure 1:
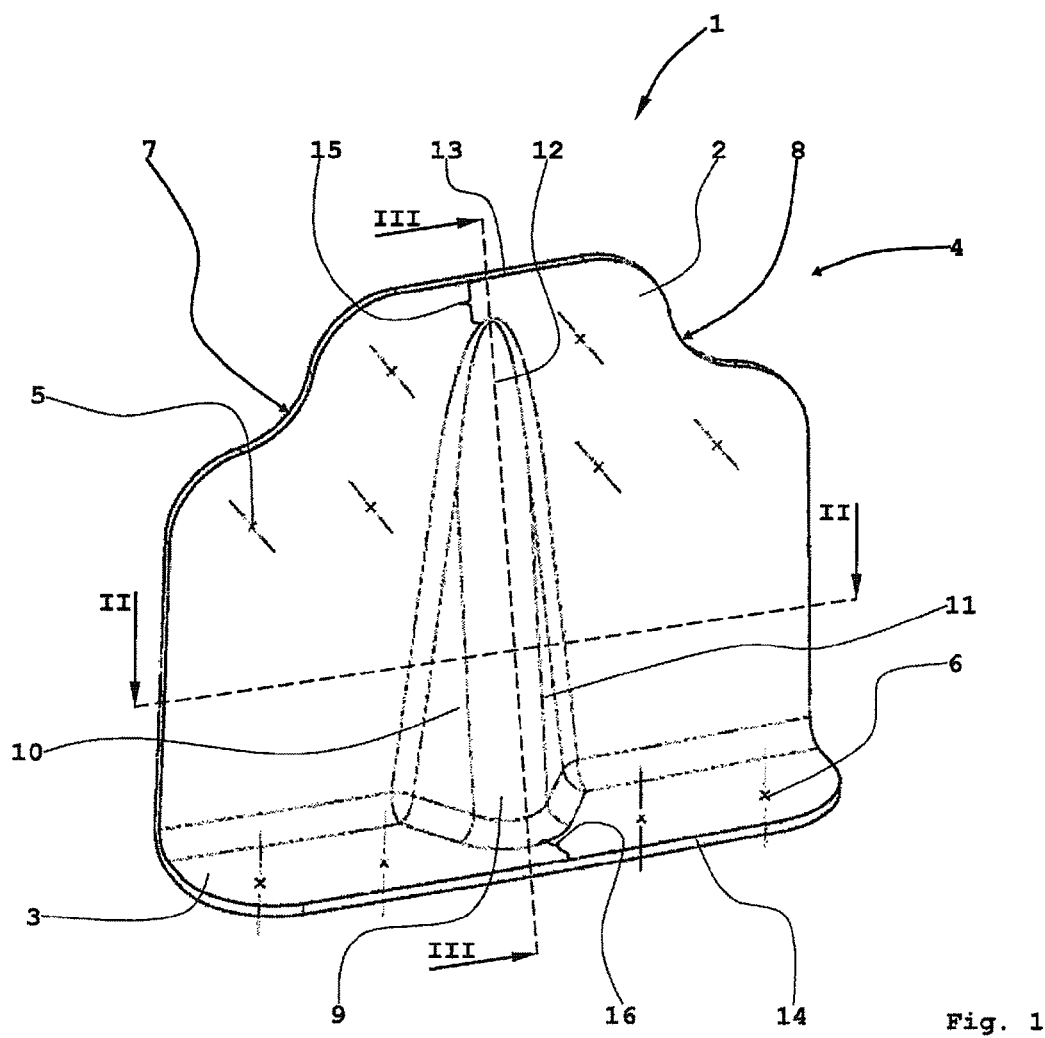
FIG. 1 shows an isometric view of a connecting bracket configured in accordance with the invention.

FIG. 1 shows an isometric view of a connecting bracket configured in accordance with the invention.

A connecting bracket 1 features a frame attachment surface 2 and a skin attachment surface 3 adjoining it at an angle of approximately 90°. The frame attachment surface 2 and the skin attachment surface 3 each have an approximately rectangular base geometry, wherein in comparison to the skin attachment surface 3 the frame attachment surface 2 features a surface area that is at least three times as large.

In an upper region 4 of the frame attachment surface 2 are located a multiplicity of holes, of which one hole, as a representative of all the others, carries the reference number 5. Correspondingly, the skin attachment surface 3 likewise features a multiplicity of holes, wherein one hole, as a representative of all the others, is provided with the reference number 6. The holes 5, 6 serve the purpose of joining together a frame, not represented, with a skin field, similarly not drawn in, of a shell segment, by means of the connecting bracket 1, with the deployment of connecting elements, such as, for example, rivets or bolts. For cases in which the joining together is undertaken by means of adhesive, the holes can on occasions be omitted. To increase the level of redundancy the joining of the cited components can also take place using both connecting elements and an additional adhesive joint. In the upper region 4 two approximately quarter-circle shaped cut-outs 7, 8 are introduced into the frame attachment surface 2. The two cut-outs 7, 8 are in each case arranged in the region of the upper (intended) corner regions, not identified, of the frame attachment surface 2. In accordance with the invention the connecting bracket 1 features at least one corrugation 9. The corrugation 9 is formed both in the region of the frame attachment surface 2 and also in the region of the skin attachment surface 3 and connects the two cited surfaces of the connecting bracket 1. The surface geometry of the corrugation 9 approximately corresponds to the geometric shape of a tip of a half-cone with two flanking surfaces 10, 11, as well as an apex line 12. Between the edges 13, 14, of the connecting bracket and the respective starts of the corrugation 9 a small separation distance 15, 16 is present in each case.

The connecting bracket 1 can for example be manufactured in one piece from an initially flat metallic sheet blank by means of a suitable forming process. The sheet blanks can, for example, be formed from aluminium alloys, titanium alloys, stainless steel alloys, or any suitable combination of these. Alternatively, it is possible to manufacture the connecting bracket 1 in one piece from fibre-reinforced composite materials, for example, using carbon fibre-reinforced epoxy resins and/or carbon fibre-reinforced thermoplastic plastics.

Figure 2:
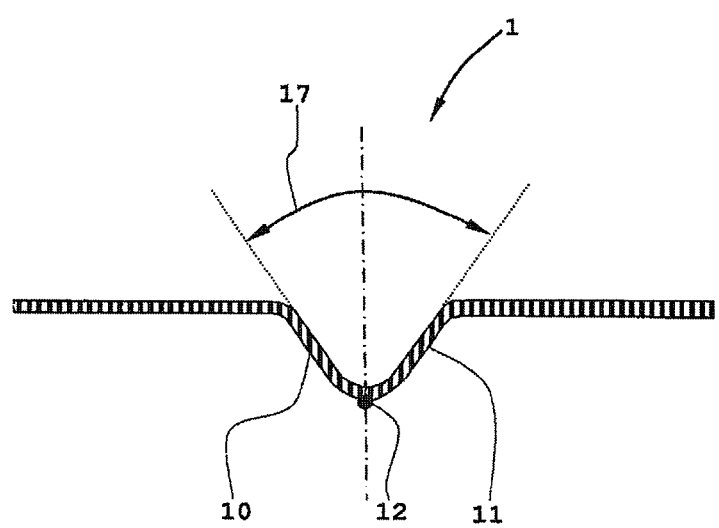
FIG. 2 shows a cross-sectional representation through the connecting bracket along the cutting line II-II in FIG. 1.

FIG. 2 illustrates a cross-sectional representation along the cutting line II-II in FIG. 1, As can be seen from the representation in FIG. 2, the two flanking surfaces 10, 11 of the connecting bracket 1 subtend an angle 17 of preferably 70° in the region of the corrugation 9. By this means an optimal torsional stiffness is achieved between the frame attachment surface 2 and the skin attachment surface 3. In the region of the apex line 12, the corrugation has an approximately semicircular-shaped cross-sectional geometry. Values of between 60° and 80° are suitable for the angle 17.

Figure 3:
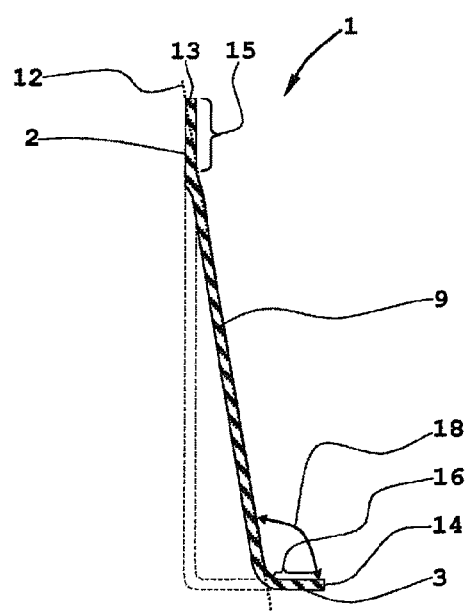
FIG. 3 shows a cross-sectional representation through the connecting bracket along the cutting line III-III in FIG. 1.

FIG. 3 illustrates a cross-sectional representation along the cutting line III-III in FIG. 1. It can be discerned that the apex line 12 of the corrugation 9 and the horizontal in the form of the skin attachment surface 3 subtend an angle 18 of approximately 100°. Values deviating from this in a range between 95° and 145° are also possible. Here the corrugation 9, starting from the frame attachment surface 2, extends at this angle as far as the skin attachment surface 3. Here the separation distance 15 between the edge 13 of the frame attachment surface 2 and the start of the corrugation 9 is preferably larger than the corresponding separation distance 16 to the edge 14 of the skin attachment surface 3.

Figure 4:
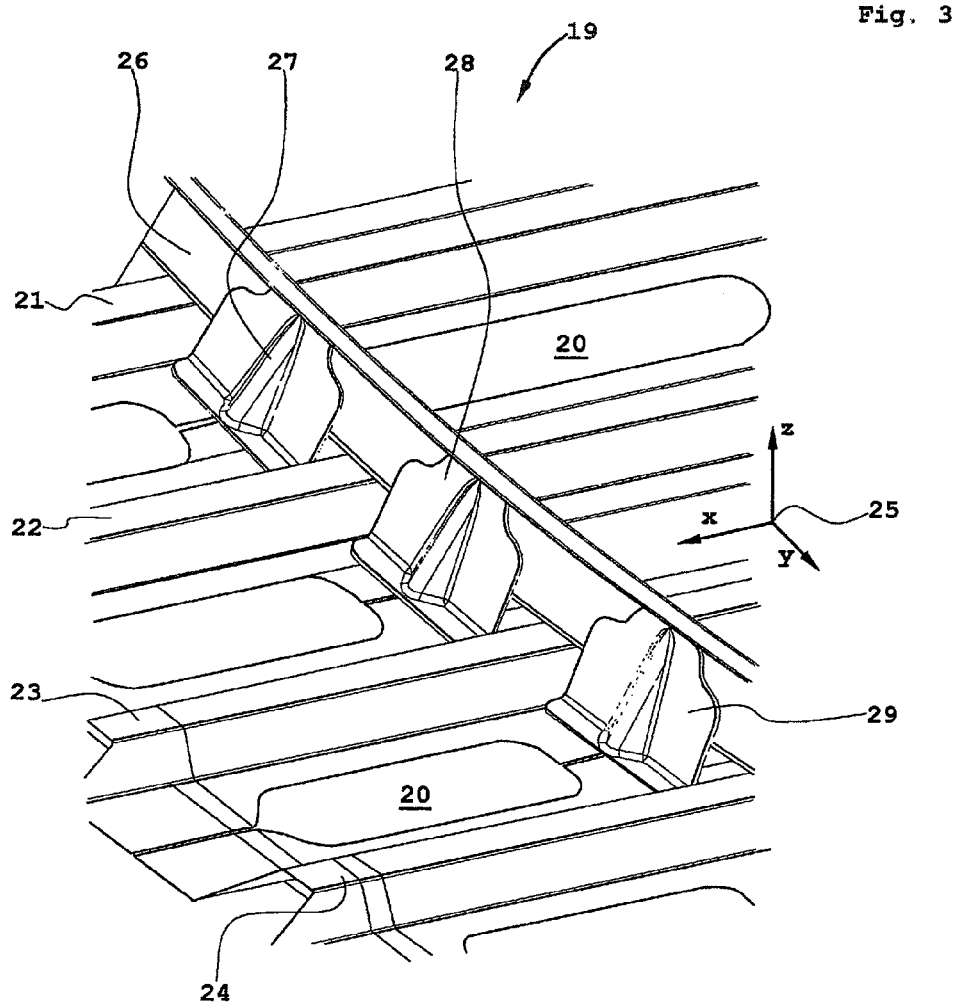
FIG. 4 shows a perspective view of a shell segment.

FIG. 4 shows in a perspective view a scrap section from a shell segment designed in accordance with the invention with the connecting brackets as elucidated above.

A shell segment 19 comprises, amongst other features, a skin field 20 with four stringers 21 to 24 arranged thereon as longitudinal stiffeners. The stringers 21 to 24 are advantageously positioned parallel to one another, evenly spaced apart on the skin field 20 located under them. They have in each case a cross-sectional geometry of an approximately trapezoidal shape, and are integrally designed with the skin field 20. At least two, as a rule, however, four, shell segments, which in each case are designed in accordance with the shell segment 19 as shown, are joined along longitudinal seams, which run parallel to the stringers 21 to 24 to form an approximately barrel-shaped fuselage section. A complete fuselage cell of an aeroplane is finally manufactured by the joining together of a plurality of fuselage sections with the creation of transverse seams.

A coordinates system 25 illustrates the location of the components shown in space. The direction of the x-axis of the coordinates system 25 corresponds to the longitudinal axis of the aeroplane fuselage cell, i.e. to the direction of flight of the aeroplane. The z-axis corresponds to the vertical axis of the aeroplane fuselage cell of the aeroplane and is always orientated away from the ground or floor. The y-axis of the coordinate system 25 runs approximately parallel to the orientation of the axes of the aeroplane's wing surfaces, not represented.

Transverse to the direction of the stringers 21 to 24, a frame 26 is attached to the shell segment 19 as a transverse stiffening element by means of three inventively configured connecting brackets 27 to 29. The constructive configuration of the three connecting brackets 27 to 29 in FIG. 4 corresponds exactly to the constructive design of the configuration of the connecting bracket 1 already elucidated in the course of the description of FIGS. 1 to 3. The mechanical connection between the three connecting brackets 27 to 29, the frame 26, and also the skin field 20, can optionally be undertaken by means of the use of adhesive, rivets or bolts, or any suitable combination of the types of connection cited. The connecting brackets 27 to 29 are in each case arranged between two stringers running parallel to one another.

As a consequence of the deployment of the inventively configured connecting brackets 27 to 29 moments in the frame 26 about the y-axis of the coordinates system 25 are absorbed and transferred into the skin field 20, so that any tilting or buckling of the frame 26, in particular in the event of high mechanical loads, is securely prevented. Moreover the connecting brackets 27 to 29 have the advantage that additional supporting brackets are no longer required for the purpose of absorbing the tilting moments of the frame 26.

By this means the weight of the shell segment 19 and the production effort required for its manufacture are significantly reduced in comparison to solutions of prior known art. In addition to their pure function of connecting the frame 26 to the skin field 20 the connecting brackets 27 to 29 thus allow at the same time the transfer of any tilting moments from the frame 26 into the skin field 20.

In a preferred form of embodiment of the shell segment 19, both the skin field 20, the stringers 21 to 24, and also the frame 26 and the connecting brackets 27 to 29 are formed using a fibre-reinforced plastic material, in particular using a carbon fibre-reinforced epoxy resin. Alternatively, it is possible, at least for the connecting brackets 27 to 29, to deploy a carbon fibre-reinforced thermoplastic plastic material. In principle, however, the shell segment 19 can also be implemented in a conventional metallic form of construction, for example, with the use of aluminium alloys of known art.

The shell segment 19 features, as a rule, a multiplicity of frames and accordingly a significantly larger number of connecting brackets. The length of a shell segment 19 can be up to 40 m, while a circumferential length of the shell segment 19 can achieve a value of up to 10 m. With the use of four shall segments with a circumferential length of, for example, 9 m in each case, it is possible, for example, to manufacture a fuselage section for an aeroplane fuselage cell in a four-shell form of construction of known art with a diameter of more than 11 m—with the assumption of an approximately circular cross-sectional geometry of the fuselage sections that are to be formed, and in each case approximately the same circumferential lengths for the shell segments. In principle, the circumferential lengths of the shell segments can deviate from one another and can even vary locally, that is to say they can have a degree of curvature deviating from the circular shape, or from the shape of a circular segment. Alternatively the fuselage section can also be manufactured in a half-shell form of construction with approximately semicircular-shaped shell segments.

REFERENCE SYMBOL LIST

1. Connecting bracket
2. Frame attachment surface
3. Skin attachment surface
4. Upper region (frame attachment surface)
5. Hole (frame attachment surface)
6. Hole (skin attachment surface)
7. Cut-out (frame attachment surface)
8. Cut-out (frame attachment surface)
9. Corrugation
10. Flanking surface
11. Flanking surface
12. Apex line
13. Edge (frame attachment surface)
14. Edge (skin attachment surface)
15. Separation distance (corrugation/edge)
16. Separation distance (corrugation/edge)
17. Angle (corrugation flanking surfaces)
18. Angle (apex line/skin attachment surface)
19. Shell segment
20. Skin field
21. Stringer
22. Stringer
23. Stringer
24. Stringer
25. Coordinates system
26. Frame
27. Connecting bracket
28. Connecting bracket
29. Connecting bracket

What is claimed is:

1. A shell segment for manufacturing a fuselage cell section for a fuselage cell of an aeroplane, the shell segment comprising:
   at least one skin field and a multiplicity of longitudinal stiffeners arranged thereon; and
   at least one transverse stiffening element running essentially transverse to the longitudinal stiffeners,
   wherein connection of the at least one transverse stiffening element to the at least one skin field is undertaken with at least one connecting bracket, the at least one connecting bracket having at least one corrugation, the corrugation extending in a longitudinal direction, and parallel to the longitudinal stiffeners wherein that the at least one corrugation is formed in the frame attachment surface and in the skin attachment surface.

2. The shell segment in accordance with claim 1, wherein the at least one connecting bracket has a frame attachment surface and a skin attachment surface, which adjoin one another at an angle of between 45° and 135°.

3. The shell segment in accordance with claim 2, wherein the at least one corrugation has two flanking surfaces which adjoin one another in a region of an apex line at an angle of between 30° and 120°.

4. The shell segment in accordance with claim 3, wherein the apex line subtends at an angle of between 95° and 145° with the skin attachment surface.

5. The shell segment in accordance with claim 1, wherein the longitudinal stiffeners are designed integrally with the at least one skin field, and have a cross-sectional geometry of an approximately trapezoidal shape.

6. The shell segment in accordance with claim 1, wherein the at least one skin field and the longitudinal stiffeners are formed using a carbon fibre-reinforced plastic material.

7. The shell segment in accordance with claim 1, wherein the at least one connecting bracket is formed using a carbon fibre-reinforced plastic material selected from the group consisting of a carbon fibre-reinforced epoxy resin material, a carbon fibre-reinforced thermoplastic plastic material, and combinations thereof.

8. The shell segment in accordance with claim 1, wherein the at least one connecting bracket is connected with the at least one transverse stiffening element and the at least one skin field via a connecting element.

9. The shell segment in accordance with claim 1, wherein a connecting bracket is provided in each case between each pair of longitudinal stiffeners and a related transverse stiffening element.

10. The shell segment in accordance with claim 6, wherein the carbon fibre-reinforced plastic material is a carbon fibre-reinforced epoxy resin.

11. The shell segment in accordance with claim 8, wherein the connecting element is selected from the group consisting of rivets, bolts, adhesive joint means, and combinations thereof.

* * * * *